(12) United States Patent
Wang et al.

(10) Patent No.: US 12,609,573 B2
(45) Date of Patent: Apr. 21, 2026

(54) MOTOR STATOR, MOTOR, AND VEHICULAR COMPRESSOR

(71) Applicant: Robert Bosch GmbH, Stuttgart (DE)

(72) Inventors: Yilin Wang, Changsha (CN); Guofu He, Changsha (CN); Zhengmao Wan, Changsha (CN)

(73) Assignee: Robert Bosch GmbH, Stuttgart (DE)

( * ) Notice: Subject to any disclaimer, the term of this patent is extended or adjusted under 35 U.S.C. 154(b) by 355 days.

(21) Appl. No.: 18/364,236

(22) Filed: Aug. 2, 2023

(65) Prior Publication Data

US 2024/0063677 A1 Feb. 22, 2024

(30) Foreign Application Priority Data

Aug. 18, 2022 (CN) .......................... 202210992189.1

(51) Int. Cl.
*H02K 3/50* (2006.01)
*H02K 1/16* (2006.01)
*H02K 3/38* (2006.01)

(52) U.S. Cl.
CPC ................ *H02K 3/50* (2013.01); *H02K 1/16* (2013.01); *H02K 3/38* (2013.01); *H02K 2203/03* (2013.01)

(58) Field of Classification Search
CPC ........................... H02K 11/30; H02K 2203/12
USPC .................................................. 310/400–417
See application file for complete search history.

(56) References Cited

U.S. PATENT DOCUMENTS

| | | | | |
|---|---|---|---|---|
| 10,119,528 B2 * | 11/2018 | Fujii | .......................... | H02K 5/22 |
| 2020/0076259 A1 * | 3/2020 | Hackl | .................... | H02K 1/185 |

FOREIGN PATENT DOCUMENTS

| | | | | |
|---|---|---|---|---|
| CN | 112997384 A | 6/2021 | | |
| CN | 111052544 B | 4/2022 | | |
| EP | 2793370 B1 | 6/2019 | | |
| JP | 3316380 B2 * | 8/2002 | | |
| WO | WO-2019082665 A1 * | 5/2019 | .............. | H02K 5/22 |

OTHER PUBLICATIONS

JP-3316380-B2 machine translation (Year: 2002).*
WO-2019082665-A1 machine translation (Year: 2019).*

* cited by examiner

*Primary Examiner* — Oluseye Iwarere
*Assistant Examiner* — Minki Chang
(74) *Attorney, Agent, or Firm* — Michael Best & Friedrich LLP

(57) ABSTRACT

A motor stator, a motor, and a vehicular compressor. The motor stator includes a stator core; a first insulated end plate and a second insulated end plate mounted at opposite end surfaces of the stator core; a wire wrapping around the stator core and the first and second insulated end plates, the wire having a conducting core and an insulated outer sheath; and a wiring board mounted to an axial outer side of the first insulated end plate. The first insulated end plate includes a plurality of insulated treatment positions and the wiring board includes a plurality of casing portions through which the insulated treatment positions can be accessed for providing insulation material.

9 Claims, 6 Drawing Sheets

MOTOR STATOR, MOTOR, AND VEHICULAR COMPRESSOR

BACKGROUND

The present disclosure relates to the field of motor stator, and more particularly, to a motor stator having a stronger insulation capability and its motor and vehicular compressor.

With the development and popularization of electric vehicles and the gradual maturation of fast charging technology, the input voltage of motors on vehicles is increasing, for example, from 48V to 800V, which also imposes higher requirements on the safety performance of motors. In the case of vehicular compressors, the motors are in a coolant and oil environment, which the coolant and oil will have a certain conductivity capacity at high voltages, raising higher requirements for the insulation performance of the motors.

SUMMARY

The purpose of the present disclosure is to solve or at least alleviate problems existing in the prior art.

In one aspect, a motor stator is provided, comprising:

a stator core;

a first insulated end plate and a second insulated end plate mounted at opposing end faces of the stator core;

a wire wrapping around the stator core and the first and second insulated end plates, the wire having a conducting core and an insulated outer sleeve;

a wiring board mounted to an axial outer side of the first insulated end plate;

wherein the first insulated end plate includes a plurality of insulated treatment locations, the wiring board having a plurality of casing portions that, when the wiring board is mounted to the first insulated end plate, the plurality of casing portions form a pouring cavity around a corresponding insulated treatment position and upon mounting of the wiring board to the first insulated end plate, the insulating material is poured into the respective pouring cavity and solidified to cover the insulated treatment position.

A motor is further provided that includes a motor stator according to various examples.

A vehicular compressor is also provided that comprises a motor according to various examples, the motor stator of the motor being arranged in a chamber of the vehicular compressor having a mixture of a cooling agent and an oil when working.

Products according to examples of the present disclosure provide better insulation.

BRIEF DESCRIPTION OF THE DRAWINGS

The present disclosure will become easier to understand with reference to the appended drawings. It is readily understood by those skilled in the art that: These drawings are for purposes of illustration only and are not intended to limit the scope of protection of this present disclosure. Further, like numerals in the figures are used to represent like components, wherein.

DETAILED DESCRIPTION

Figure 1:
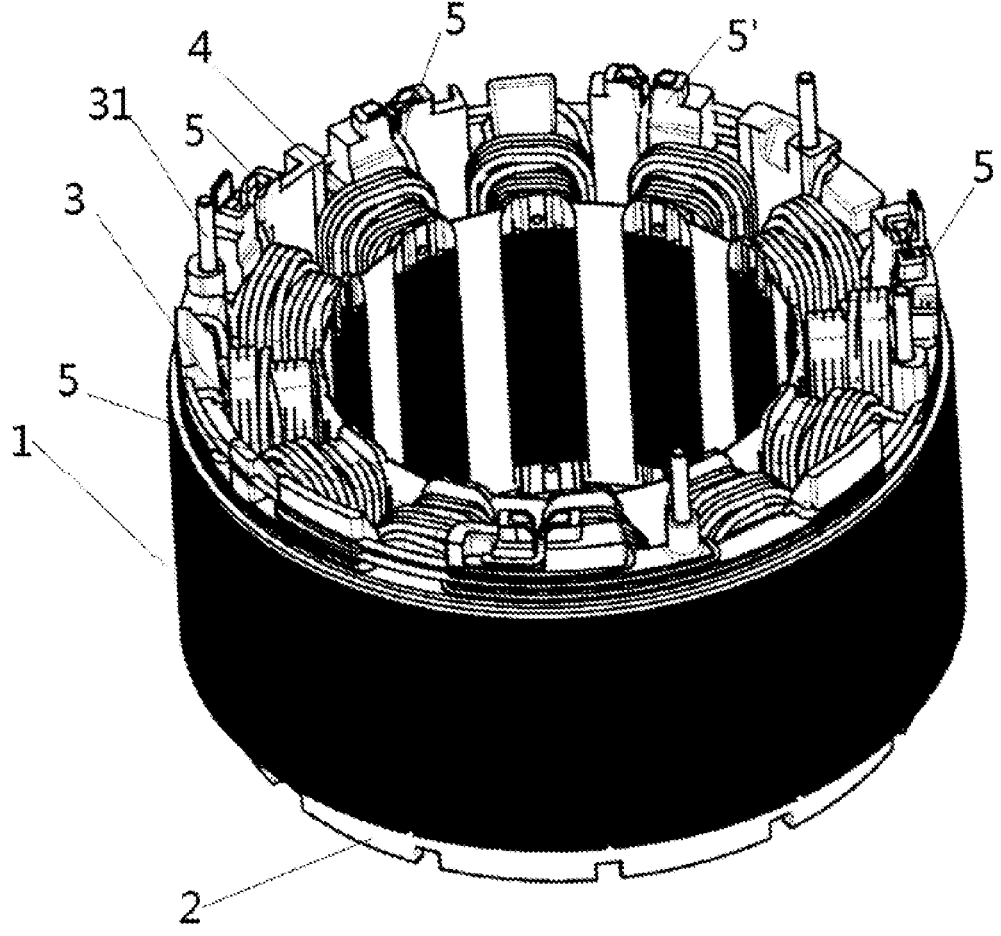
FIG. 1 illustrates a stereoscopic view of a motor stator when the wiring board is not assembled according to an example.

The term "axial", "radial", and "circumferential" as referred to in the following description is based on the direction of rotation of the motor rotor when the motor stator is actually used. In addition, "axially outward" refers to a direction axially away from the axial center of the motor stator, "axially inward" is opposite to "axially outward", "radially outboard" is a direction radially away from the rotor axis, and "radially inward" is opposite to "radially outward".

Referring to FIGS. 1-5, a motor stator according to an example of the present disclosure is described. The motor stator comprises: the stator core 1; the first insulated end plate 3 and the second insulated end plate 2 mounted at the opposite ends of the stator core 1; the wire 4 wrapping around the stator core 1 and the first and second insulated end plates 3 and 2, the wire 4 having a conducting core and an insulated outer sheath; the wiring board 6 (FIG. 4) being mounted to the axial outer side of the first insulated end plate 3; the first insulated end plate comprises a plurality of insulated treatment positions 5,5'. The wiring board 6 has a plurality of casing portions 6; when the wiring board 6 is installed to the first insulated end plate 3, the plurality of casing portions 61 form a pouring cavity 600 around the corresponding insulated treatment positions 5,5', and after the wiring board 6 is mounted to the first insulated end plate, the insulating material (such as epoxy resin and other resins) is poured into the respective pouring cavity 600 and solidified to cover the respective insulated treatment position 5,5'; by adopting this process, the insulation performance of the motor stator is strengthened, and this process can be automatically implemented for automatic production.

The stator core 1 may be formed, for example, from a stack of multi-layer silicon steel sheets and have a plurality of inner teeth. The first insulated end plate 3 and the second insulated end plate 2 may be both ends, e.g., made of plastic material and fixed to an axial direction of the stator core 1. The first insulated end plate 3 and the second insulated end plate 2 may be generally circular and have a portion corresponding to the inner teeth of the stator core 1 and partially or completely cover both ends of the stator core 1 for insulation. After the first insulated end plate 3 and the second insulated end plate 2 are assembled to the stator core 1, the wire 4 may wrap around the combined stator core 1, the first insulated end plate 3, and the second insulated end plate 2 to form a pre-assembled stator. The wiring board 6 may then be mounted to an axially outward side of the first insulated end plate 3 of the pre-assembled stator. The wiring board 6 may have a body, e.g., that is generally circular in shape. The body of the wiring board 6 also comprises the external stator socket 11 in addition to the plurality of casing portions 61. A plurality of wires are fixed to the body of the wiring board 6, e.g., molded in the body of the wiring board 6 to ensure its insulation, and therefore are not visible in the figures. An end of a portion of the plurality of wires may extend from the external stator external socket 11 to form a connecting end. An end of a portion of the plurality of wires can be seen extending into the plurality of casing portions 61 from inside the insulating shell 7. A plurality of wires molded in the body of the wiring board 6 extend between the casing portion 61 and the external stator external socket 11 or between the two casing portions 61. Accordingly, the wiring board 6 when installed on the pre-assembled stator is intended to connect with the wire 4 in different positions and connect the wire 4 to the external stator socket 11, which thereby powers the wire 4 by, for example, connecting to an external power supply. It should be understood that a seal ring, etc., may be provided at the external stator socket 11 to ensure the sealing of its connection to an external power supply.

The insulated treatment positions 5,5' of the wiring board 4 refers to the exposed or to-be-exposed positions of the conducting core of the wire 4, including the end 43 of the wire 4 and the connection between the wire and the cable of the wiring board. For the end 43 of the wire 4, the conducting core will be exposed on the end face to form a potential leakage position due to the cut of the wire 4. The connection is located in the middle of the wire 4 and the insulated sheath of the wire 4 is removed to electrically connect with the cable of the wiring board 6.

In order to reduce the number of insulated treatment positions for ease of processing, the ends of the wire may be disposed adjacent the connection such that a single casing portion can both surround the ends of the wire and the connection. However, when the number of ends of the wire is different from the connection, there may be several casing portions that surround only the end of the wire or only the connection. For example, in the illustrated example, there are two wires with a total of 4 wiring ends (including the beginning and end of each wire), and there are 5 connections, so the insulated treatment positions 5,5' comprise 4 wiring ends, a combined connection 5, and a separate connection 5'. It should be understood that although shown in the illustrated example, the insulated treatment positions 5,5' comprise a combination 5 of a single wiring end and a single connection; in alternative examples, depending on the wrapping of the wire 4 and the wiring of the wiring board 6, there may be a combination of one or more wiring ends, one or more connections, or any number of wiring ends and any number of connections, which may be surrounded by a single casing portion, respectively; the casing portion may have a larger or smaller size. In alternative examples, the insulated treatment positions are not limited to the wiring end or connection, which may be any location where there is a risk of electrical leakage.

Figure 2:
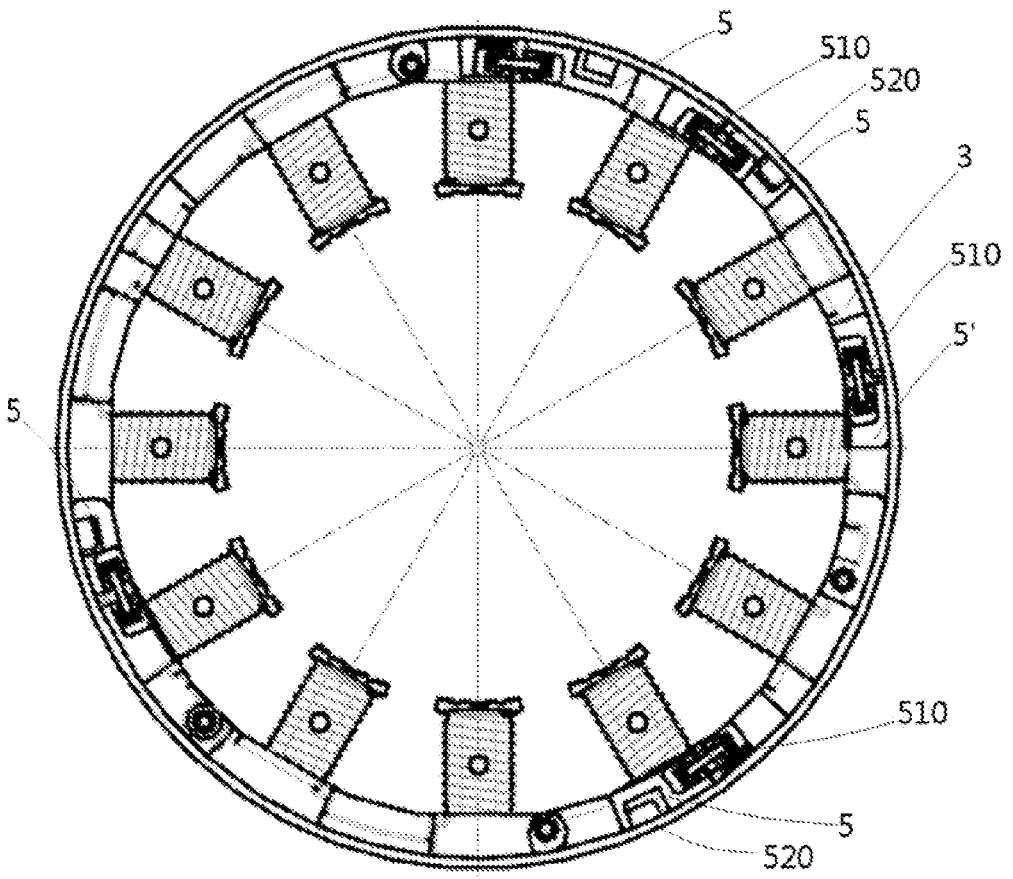
FIG. 2 shows a top view of the first insulated end plate of FIG. 1.
Figure 3:
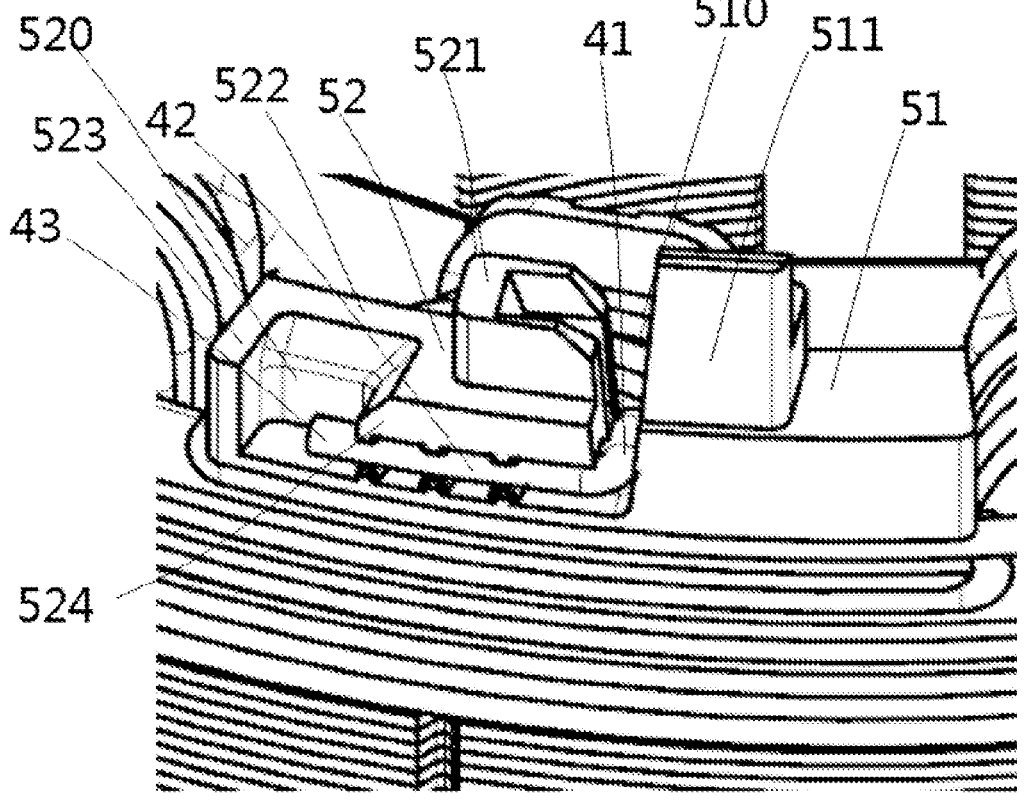
FIG. 3 shows an enlarged view of the insulated treatment area in FIG. 1.

As shown in FIGS. 2 and 3, in some examples, a plurality of wire head cavities 520 are provided on a first insulated end plate, with ends 43 of each wire comprising a beginning and an end arranged in each of the respective wire head cavities 520 as the wire wraps. This may be achieved by beginning a winding wrap from the wire head cavity 520 and cutting the wire at another wire head cavity 520. In some examples, a plurality of sockets 510 are further provided on the first insulated end plate, the wire comprising a connecting portion 41 passing through the plurality of sockets 510. In some examples, the insulated treatment positions may include: a separate wire head cavity, a separate socket, and a combined wire head cavity and socket, as described above, the number of wire head cavities and sockets in the insulated treatment positions may be set arbitrarily.

In some examples, a wired channel is provided between the corresponding wire head cavity 520 and the socket 510, and the wire extends from the connecting portion 41 through the wired channel to the wire head cavity 520 and terminates at the beginning and end of the end 43 of the wire, wherein the wiring portion 42 in the wired channel may be arranged in the wired channel; for example, a plurality of cable ribs may be provided in the wired channel, such that the ends of the wire may be substantially stable in the wire head cavity 520.

In some examples, the socket 510 comprises a first half 521 and a second half 511, the connecting portion 41 of the wire passing through a wiring duct between the first half 521 and the second half 511, the first half 521 of the socket and the wall of the corresponding wire head cavity protruding from the base surface of the first insulated end plate, the second half 511 being spaced apart from the first half and protruding from the base surface of the first insulated end plate. More specifically, a boss protruding from the base surface can be included that the wiring duct radially divides the boss into a first boss portion 52 and a second boss portion 51, the socket comprising a second half 511 that further projects out of the second boss portion 51 and a first half 521 that further projects out of the first boss portion 52, the first half 521 and the second half 511 having a U-shaped shape when viewed at the top to collectively define the socket. The second boss portion 51 also forms a wired channel and a wire head cavity. In the illustrated examples, the wiring duct extend radially, and the wiring duct of the socket communicates with the corresponding wire head cavity through a circumferential wired channel, which has a plurality of pairs of cable ribs. In the illustrated example, the wall of the wire head cavity 520 comprises an inner wall 522 located radially inward of the wire head cavity and a pair of circumferentially opposite sidewalls 523,524, the wire head cavity 520 and the wired channel being radially and outwardly open, while the wire head cavity 520 being axially and inwardly open (the top side of the FIG. 3), such that the arrangement of the wire head cavity 520 and the wired channel can be automatically wounded (the cable clamp of the mechanical arm can insert into the wire head cavity 520 and make the wire to radially insert the wired channel) through the mechanical arm, thus achieving automatic winding.

Figure 4:
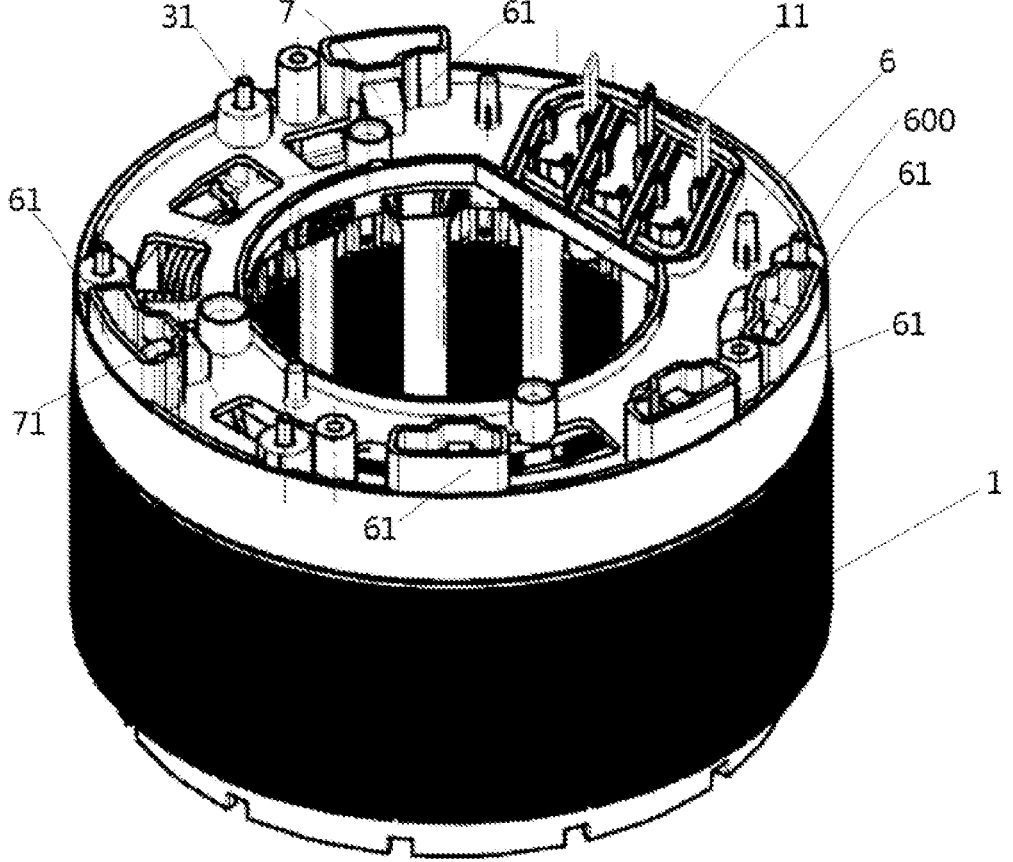
FIG. 4 shows a stereoscopic view of a motor stator when the wiring board is assembled according to an example.
Figure 5:
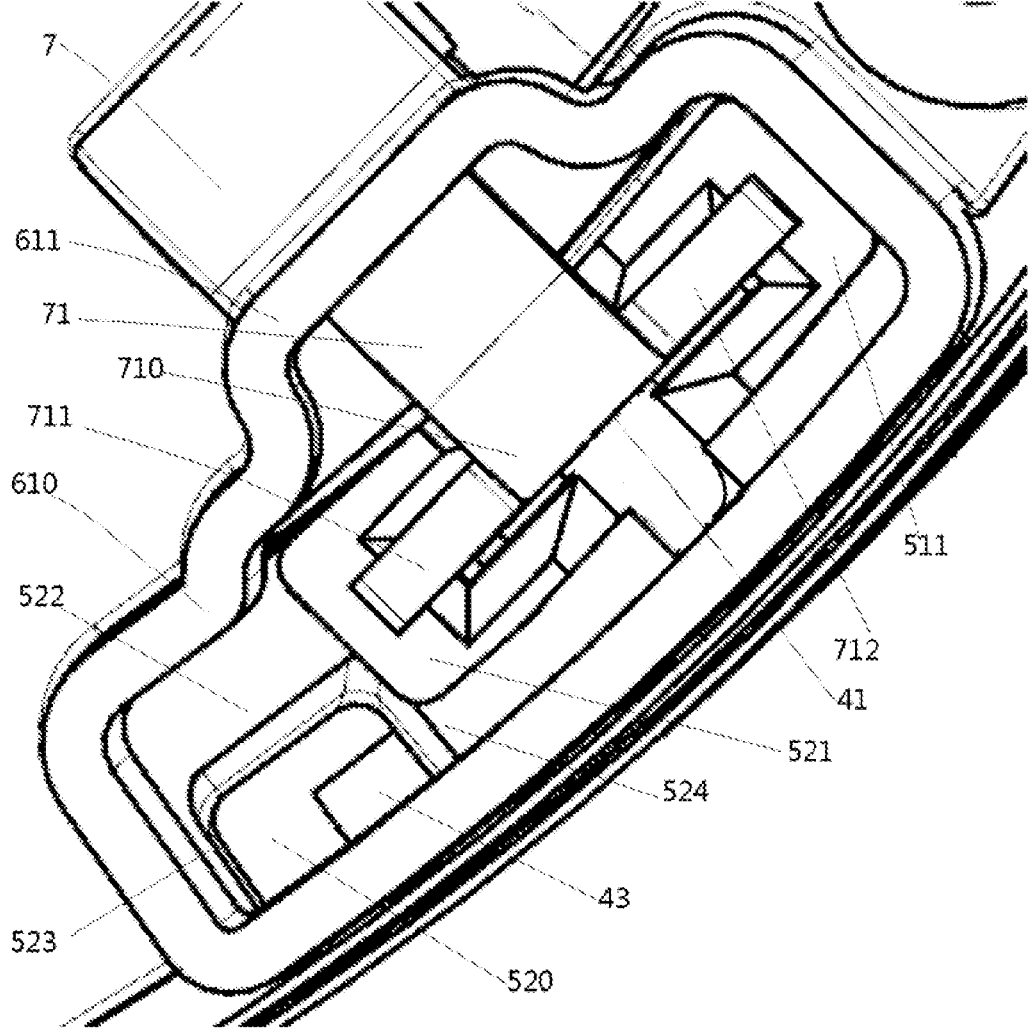
FIG. 5 shows an enlarged view of the insulated treatment area in FIG. 4.

Referring to FIGS. 4 and 5, the wire comprises an electrically-coupled end in the form of an insert 71 extending from the sidewall 610 of the casing portion 61 to the interior of the casing portion. The insert 71 or the electrically-coupled end may be electrically connected with the connection portion 41 of the wire when the wiring board 6 is mounted to the first insulated end plate 3 or in the socket 510 of the first insulated end plate after the wiring board is mounted to the first insulated end plate. In some examples, an insulated outer sheath that disrupts the connecting portion of the wire during insertion of the insert 71 into the socket to contact and electrically connect with the conducting core. As can be seen in the figure, the insert 71 comprises a curved portion 710 and a portion of inserting into the socket 510, and the inserted portion is in turn split into the first portion 711 and the second portion 712 on both sides of the connecting portion 41 of the wire, each comprising a blade (not shown) to cut off the insulated outer sheath of the connecting portion 41 when inserted. In some examples, the sidewall of the casing portion has a protruding position 611 from which the wire 7 extends into the casing portion, thereby allowing the wire 7 to have a sufficiently long curved portion 710 and provide sufficient space for automatic socket insertion. In some examples, the wiring board 6 may be mounted axially to the first insulated end plate 3 by a guide pin 31 on the first insulated end plate 3, which may then be fixed to the first insulated end plate 3 by heat riveting or other suitable means at the guide pin 31. When the wiring board 6 is mounted to the first insulated end plate 3, the insert on the wiring board 6 may be inserted in the socket 510 of the first insulated end plate 3 in a way that does not damage the sheath of the wire. Then, by further pressing the insert to get it fully inserted into the socket and damage the sheath of the wire, as the casing portion has a protruding position 611, sufficient deformation of the complete portion 710 and sufficient operating space for the pushdown operation are provided so that the operation can be performed automatically. In some examples, the sidewall 610 of the casing portion extends axially, and alternatively, the sidewall 610 of the casing portion may also be inclined, convergent, or divergent. The casing portion comprises open ends.

In some examples, the corresponding wire head cavity 520 and the socket 510 protrude from the base surface of the first insulated end plate; when the wiring board 6 is mounted to the first insulated end plate 3, the base surface of the first insulated end plate and corresponding casing portion are closely engaged to define the pouring cavity 600 (each forming the underside and sidewall of the pouring cavity 600), with the pouring cavity 600 being axially and outwardly open for the pouring of the insulating material. An engagement position of the pouring cavity, such as a joint of the base surface with the casing portion, or a wall of the protruding wire head cavity 520 and a wall of the socket 510 with the sidewall of the casing portion, should be provided with a dimension of less than 0.5 mm, such as 0.3 mm to prevent excessive leakage of the poured insulating material. It should be understood that since the poured insulating material has a certain adhesion and the insulating material partially penetrates into these gaps is desirable, the dimension of these gaps may be controlled between 0.2 mm and 0.4 mm for the convenience of assembly. In some examples, the insulating material is poured and solidified with a distance of at least 1 mm from the surface thereof to the end of the wire and at the connection of the wire to the cable in the wiring board such that there is a sufficient layer of insulating material to provide sufficient insulation.

Figure 6:
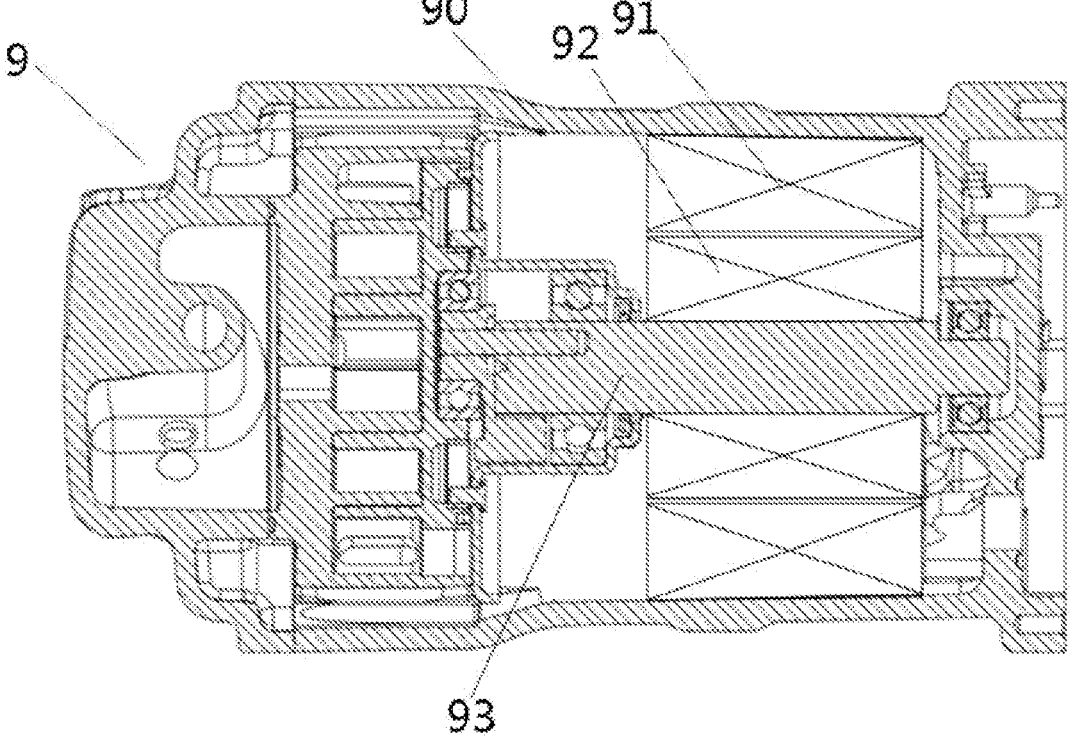
FIG. 6 shows a cross-sectional view of an vehicular compressor according to an example.

In another aspect, a motor, such as an vehicular compressor motor, is provided that comprises a motor stator according to various examples. In another aspect, an vehicular compressor is provided, comprising a motor according to various examples. As shown in FIG. 6, the vehicular compressor 9 may comprise a housing in which motor stator 91 according to various examples of the present disclosure may be arranged in a chamber defined by the housing 90, wherein the motor rotor 92 is positioned inside the motor stator 91, the motor rotor 92 rotates when the motor stator 91 is energized and causes the motor rotor shaft 93 to rotate, which may be directly connected to or connected via drive gear sets to a compressor vortex to compress incoming fluid, the incoming fluid comprising a cooling agent. The motor stator 91 is mounted in a chamber of the compressor, such as the suction chamber, which is filled with a hybrid fluid of oil and cooling agent during the operation, and the running vortex compresses the fluid from the suction chamber and outputs through the evacuation chamber. The hybrid fluid presents semiconductor properties at high voltage, providing a motor stator with enhanced insulation to guarantee stable operation in such environments.

Various devices according to the present disclosure provide enhanced insulation. Furthermore, the above-described insulation treatment and winding of the wire are adapted to automatic machine production. In addition, the wiring end and the connection are disposed adjacently and the same casing portion is surrounded to reduce the number of insulated treatment positions, thereby reducing the workload and difficulty of subsequent pouring steps.

The specific embodiments described above in the present example only provide a clearer description of the principles of the disclosure, in which the various components are clearly illustrated or described to make the principles of the invention easier to understand. Various modifications or variations to the present disclosure may be readily made by those skilled in the art without departing from the scope of the present disclosure. It is therefore to be understood that these modifications or variations should be included within the patent protection scope of the present disclosure.

The invention claimed is:

1. A motor stator comprising:
a stator core (1);
a first insulated end plate (3) and a second insulated end plate (2) mounted at opposing end faces of the stator core;
a wire (4) wrapped around the stator core (1) and the first insulated end plate (3) and the second insulated end plate (2), the wire (4) having a conductor core and an insulated coat;
a wiring board (6), the wiring board (6) mounted to an axial outer side of the first insulated end plate (3);
wherein the first insulated end plate (3) comprises a plurality of insulated treatment positions (5,5'), the wiring board (6) having a plurality of casing portions (61); when the wiring board (6) is mounted to the first insulated end plate (3), the plurality of casing portions (61) surround corresponding insulated treatment positions (5,5') to form a pouring cavity, and after the wiring board (6) is mounted to the first insulated end plate (3), insulating material is poured into a respective pouring cavity to solidify and cover the respective insulated treatment positions (5,5');
wherein a plurality of wire head cavities (520) are provided on the first insulated end plate (3), and when the wire (4) is wrapping, an end (43) of each wire is arranged in the respective wire head cavities (520), and a plurality of sockets (510) are provided on the first insulated end plate, the wire comprises a connecting portion (41) passing the plurality of sockets (510), wherein the insulated treatment positions (5) comprise: separate wire head cavities (520), separate socket (510), or combined wire head cavities (520) and socket (510).

2. The motor stator according to claim 1, wherein the plurality of insulated treatment positions (5,5') include an end (43) of the wire and/or a connection of the wire and the wiring board.

3. The motor stator according to claim 2, wherein the end (43) of the wire is disposed adjacent to a connection such that a single casing portion (61) can simultaneously surround the end of the wire and the connection.

4. The motor stator according to claim 1, wherein a wired channel is provided between the corresponding wire head cavity (520) and the socket (510), the wire extending from the connecting portion (41) to the wire head cavity (520) and terminating at an end (43), a winding portion (42) of the wired channel being arranged in the wired channel.

5. The motor stator according to claim 1, wherein the wiring board (6) comprises:
a body having a plurality of casing portions (61) and an external stator socket (11) thereon;
a plurality of wires fixed to the body, the plurality of wires extending between the casing portion (61) and the external stator socket (11), or between two casing portions (61);

the wire comprises an electrically coupled end extending from a sidewall (610) of the casing portion (61) to an insert (71) inside the casing portion, the insert (71) being inserted into a socket (510) of the first insulated end plate and being electrically connected to the connecting portion (41) of the wire when or after the wiring board is mounted to the first insulated end plate, wherein an insulated jacket of the connecting portion (41) of the wire is damaged to be electrically connected to the conductor core when the insert (71) inserts into the socket, and the casing portion comprises the sidewall (610) extending axially and two open ends, wherein the insert (71) extends from a protruding position (611) of the sidewall (610) of the casing portion to the casing portion.

6. The motor stator according to claim 1, wherein each socket comprises a first half (521) and a second half (511), the connecting portion (41) of the wire passes through a wiring duct between the first half (521) and the second half (511) of the socket, the first half of the socket and a wall of the corresponding wire head cavity (520) protruding from a base surface of the first insulated end plate, the second half (511) and the first half (521) being separated by the wiring duct and protruding from the base surface of the first insulated end plate, wherein the wiring duct extends radially, and the wiring duct of the socket connects with the wire head cavity through a circumferential wired channel, a plurality of cable ribs being disposed in the wired channel; a sidewall of the wire head cavity comprises an inner wall (522) radially inside the wire head cavity and a pair of opposing sidewalls (523, 524) circumferentially, and the wire head cavity and the wired channel being radially and outwardly open, and the wire head cavity being axially and outwardly open.

7. The motor stator according to claim 1, wherein the corresponding wire head cavity and the socket protruding from a base surface of the first insulated end plate when the wiring board (6) is mounted to the first insulated end plate (3), the base surface of the first insulated end plate (3) and the corresponding casing portion (61) are closely engaged to define the pouring cavity together, wherein the pouring cavity is axially and outwardly open and an engaged position of the pouring cavity has a gap less than 0.5 mm such that after the insulating material is poured and solidified, there is at least a distance of 1 mm from an outer layer of the insulating material to an end of the wire, and from the wire to a connection of the wiring board.

8. A motor, wherein the motor comprises the motor stator according to claim 1.

9. A vehicular compressor, wherein the vehicular compressor comprises the motor of claim 8, the motor stator of the motor being arranged in a chamber of the vehicular compressor, wherein the chamber has a mixture of a cooling agent and an oil when working.

\* \* \* \* \*